(12) United States Patent  
Vanhees

(10) Patent No.: US 7,896,142 B2
(45) Date of Patent: Mar. 1, 2011

(54) SHOCK ABSORBER DIRT SHIELD

(75) Inventor: Gert Vanhees, Kortessem (BE)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 284 days.

(21) Appl. No.: 11/724,640

(22) Filed: Mar. 15, 2007

(65) Prior Publication Data

US 2008/0224437 A1     Sep. 18, 2008

(51) Int. Cl.
*F16F 9/38* (2006.01)
*F16F 9/00* (2006.01)

(52) U.S. Cl. .......................... 188/322.12; 188/322.16; 280/124.155

(58) Field of Classification Search ............ 188/322.12, 188/322.16, 322.17, 315, 322.14; 280/124.155; 267/64.21, 64.24, 136
See application file for complete search history.

(56) References Cited

U.S. PATENT DOCUMENTS

| 3,102,722 | A | * | 9/1963 | Hamontre | 267/165 |
| 3,597,521 | A | * | 8/1971 | Tragesser | 174/12 BH |
| 3,798,744 | A | * | 3/1974 | Smith | 29/436 |
| 4,712,776 | A | * | 12/1987 | Geno et al. | 267/64.21 |
| 4,823,922 | A | * | 4/1989 | Ergun | 188/282.8 |
| 4,828,232 | A | * | 5/1989 | Harrod et al. | 267/64.24 |
| 5,366,048 | A | * | 11/1994 | Watanabe et al. | 188/267.1 |
| 5,431,426 | A | * | 7/1995 | Ijams et al. | 280/276 |
| 5,775,720 | A | * | 7/1998 | Kmiec et al. | 188/322.15 |
| 6,361,027 | B1 | * | 3/2002 | Lun | 267/64.21 |

FOREIGN PATENT DOCUMENTS

| DE | 69 43 380 U | 3/1970 |
| DE | 41 27 616 C1 | 11/1992 |
| DE | 43 27 915 A1 | 3/1995 |
| DE | 196 42 827 A1 | 10/1997 |
| EP | 0 992 372 A | 4/2000 |

OTHER PUBLICATIONS

Search Report dated Feb. 23, 2010 from corresponding EP patent application No. 07839850.0.

* cited by examiner

*Primary Examiner* — Melody M Burch
(74) *Attorney, Agent, or Firm* — Harness, Dickey & Pierce, PLC

(57) ABSTRACT

A shock absorber includes a dynamic vibration absorber which is designed to suppress the vibrations of the piston rod of the shock absorber. The dynamic vibration absorber includes a damping mass which is formed as a dirt shield to protect the shock absorber from contaminants.

9 Claims, 6 Drawing Sheets

SHOCK ABSORBER DIRT SHIELD

CROSS-REFERENCE TO RELATED APPLICATIONS

1. Field

The present disclosure relates to dampers or shock absorbers for use with a vehicle's suspension system. More particularly, the present disclosure relates to a damper or shock absorber which includes a dynamic vibration absorber to reduce the vibrations and/or noise transmitted to the passenger compartment.

2. Background

The statements in this section merely provide background information related to the present disclosure and may not constitute prior art.

Shock absorbers are used in conjunction with automobile suspension systems and other vehicle suspension systems to absorb unwanted vibrations which occur during operation of the vehicle. To absorb this unwanted vibration, shock absorbers are connected between the sprung mass (the body) and the unsprung mass (the suspension system) of the vehicle. A piston is located within a pressure tube of the shock absorber and is connected to the sprung mass of the vehicle. The pressure tube is connected to the unsprung mass of the vehicle and is normally filled with hydraulic fluid. Because the piston has the capability to limit the flow of hydraulic fluid within the pressure tube when the shock absorber is compressed or extended, the shock absorber is able to produce a damping force which counteracts the vibrations which would otherwise be transmitted from the suspension (unsprung mass) to the body (sprung mass) of the vehicle.

A conventional dual tube shock absorber comprises a pressure tube with a piston disposed therein and a reserve tube surrounding the pressure tube. A piston rod is connected to the piston and it extends through the upper end of the pressure and reserve tubes. At the lower end of the pressure tube, a base valve is located between the pressure tube and the reserve tube. The base valve controls fluid flow between the working chamber defined by the pressure tube and the reserve chamber defined by the reserve tube. The damping force is created by the restricted flow of fluid through passages and valving in the piston which regulate passage of fluid between opposite sides of the piston within the working chamber and by the restricted flow of fluid through passages and valving in the base valve which regulate passage of fluid between opposite sides of the base valve between the working chamber and the reserve chamber.

Due to the piston rod being located on only one side of the piston, a different amount of fluid is displaced on the compression stroke as opposed to the rebound stroke. The difference in the amount of fluid is termed the rod volume. The rod volume of fluid is pushed out of the pressure tube, through the base valve and into the reserve tube during a compression stroke. During a rebound stroke, the rod volume of fluid flows in the opposite direction from the reserve tube, through the base valve and into the pressure tube.

The piston rod is supported at its lower end by the piston and is slidingly received at the upper end of the shock absorber by a rod guide. The rod guide thus functions as a slide bearing for the rod. The rod guide properly positions the piston rod within the pressure tube and also acts as a closure member for both the pressure tube and the reserve tube. In order for the smooth sliding of the piston rod through the rod guide, a slight clearance is formed between the inner periphery of the bearing portion of the rod guide and the outer periphery of the piston rod. This slight clearance allows for the hydraulic fluid to lubricate the interface between the piston rod and the rod guide.

The suspension system is an important contributor to the generated interior structure borne noise in a passenger vehicle. The shock absorber produces high frequency forces (50-1000 Hz) that are not or are hardly audible at the shock absorber level. Hydraulic transitions, opening and closing of check valves and the friction between the various components are mostly the root cause of this non-linear behavior.

These vibrations are transmitted throughout the vehicle's body and locally these vibrations are attenuated at various local structures of the body such as the floor pan, the frame and others. These structures then generate typical low frequency "knocking" noise mostly situated around 150-300 Hz. The "knocking" noise due to transitions is generally known as clatter or chuckle noise.

The top mounting for the shock absorber is the rubber interface between the shock absorber and the vehicle's body and this mount should sufficiently filter out these vibrations. Optimal noise, vibration and harshness (NVH) performance requires low dynamic stiffness at high frequencies. However, this performance requirement has to be taken in accordance with quasi static performance for handling, steering and braking events which require high static stiffness.

One root cause of the problem has been identified as an insufficient damped shock absorber piston rod. The piston rod vibrates at a resonance in the range of 150-400 Hz determined by the rod mass, top mount dynamic stiffness and damper oil compressibility. FIG. 6 illustrates the mechanical equivalent spring-mass-damper system of a shock absorber. As can be seen in FIG. 6, there are in fact two degrees of freedom (two vibrating masses). The first is the piston rod and the second is the damper tube or tubes. However, the transmitted forces caused by the piston rod are the highest and thus this resonance is most dominant. The formula for the rod resonance frequency is $$f_o = \frac{1}{2\pi}\sqrt{\frac{K_{damper} + K_{topmount}}{M_{damperrod}}}$$

The excitation is caused by hydraulic transitions, opening and closing of check valves and friction in the shock absorber movement transition points which generate pressure waves. These pressure waves will excite the piston rod mass, which will vibrate at its resonance. Internal hydraulic damping by means of bleeds will lower the resulting piston rod acceleration levels and transmitted forces. FIG. 7 illustrates the measured and simulated resonance for a specific shock absorber. FIG. 7 shows that the resonance frequency is located at approximately 320 Hz. In order to improve NVH performance, reduction or elimination of this resonance frequency is desired.

SUMMARY

The present disclosure provides a tuned dynamic vibration absorber for the piston rod of the shock absorber. The tuned dynamic vibration absorber is an effective and easy way to suppress vibrations at a specific resonance frequency. The tuned dynamic vibration absorber is designed to suppress the resonance of a first order system by adding a simple spring/mass system. The spring rate and mass of the added system must be chosen such that this system has a resonance frequency on its own equal to the resonance frequency of the "problem" system. The dirt shield for the shock absorber is designed to be the tuned dynamic vibration absorber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
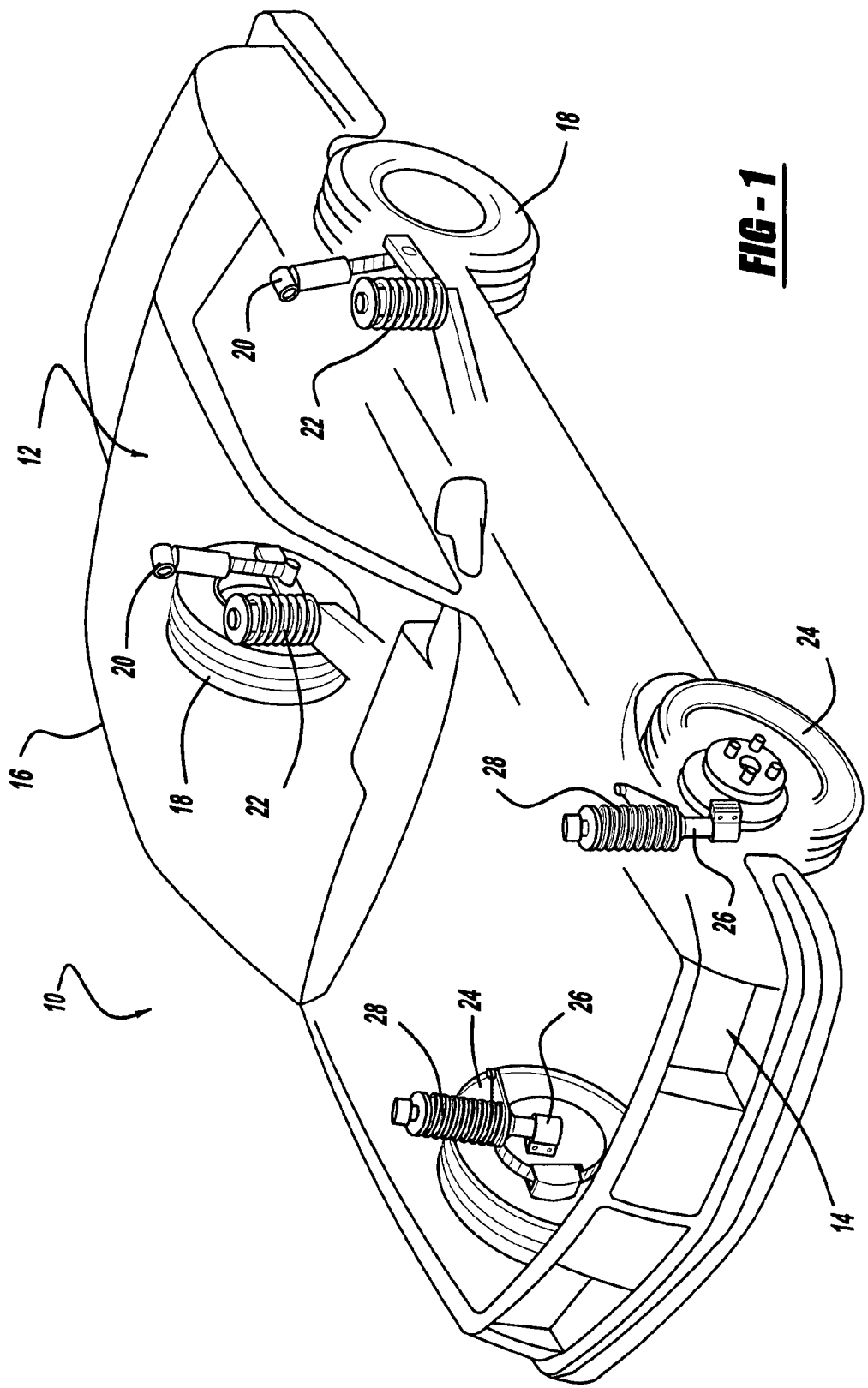
FIG. 1 is a schematic representation of an automobile which includes shock absorbers incorporating the tuned dynamic vibration absorber in accordance with the present disclosure.

The following description is merely exemplary in nature and is not intended to limit the present disclosure, application, or uses. Referring now to the drawings in which like reference numerals designate like or corresponding parts throughout the several views, there is shown in FIG. 1, a vehicle incorporating shock absorbers which include the dynamic vibration absorber in accordance with the present disclosure which is designated generally by the reference numeral 10. Vehicle 10 includes a rear suspension system 12, a front suspension system 14 and a body 16. Rear suspension system 12 includes a pair of rear suspension arms adapted to operatively support a pair of rear wheels 18. Each rear suspension arm is attached to body 16 by means of a shock absorber 20 and a helical coil spring 22. Similarly, front suspension system 14 includes a pair of suspension arms adapted to operatively support a pair of front wheels 24. Each suspension arm is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12, 14) with respect to the sprung portion (i.e., body 16) of vehicle 10. While vehicle 10 has been depicted as a passenger vehicle having independent front and rear suspension systems 12, 14, shock absorbers 20 and 26 may be used with other types of vehicles having other types of suspensions and springs or in other types of applications including, but not limited to, vehicles incorporating air springs, leaf springs, non-independent front and/or non-independent rear suspension systems. Further, the term "shock absorber" as used herein is meant to refer to dampers in general and thus will include MacPherson struts, spring seat units as well as other shock absorber designs known in the art.

Figure 2:
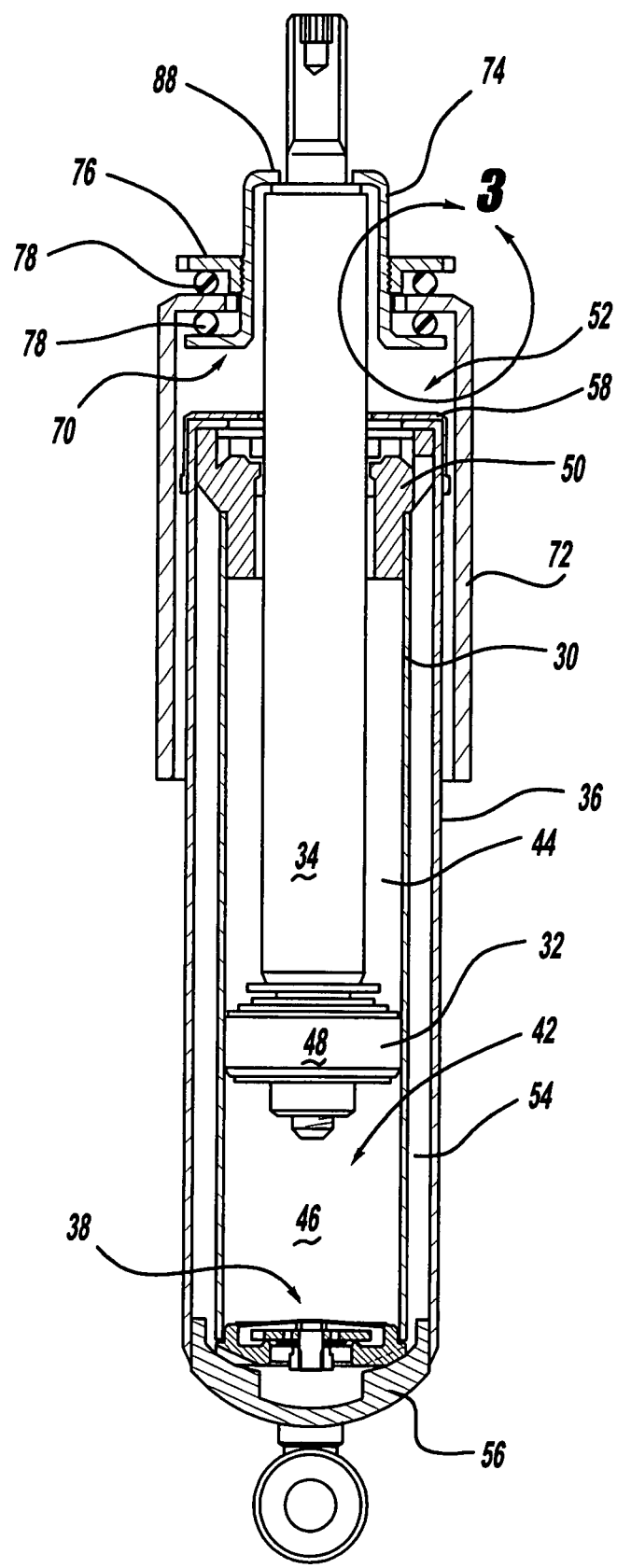
FIG. 2 is a side elevational view, partially in cross-section, of a shock absorber incorporating the tuned dynamic vibration absorber in accordance with the present disclosure.

Referring now to FIG. 2, rear shock absorber 20 is shown in greater detail. While FIG. 2 shows only rear shock absorber 20, it is to be understood that front shock absorber 26 is also designed to include the dynamic vibration absorber in accordance with the present disclosure. Front shock absorber 26 only differs from rear shock absorber 20 in the way it is adapted to be connected to the sprung and unsprung portions of vehicle 10. Shock absorber 20 comprises a pressure tube 30, a piston assembly 32, a piston rod 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper rod guide 50 which closes the upper end of both pressure tube 30 and reserve tube 36. A sealing system 52 seals the interface between rod guide 50, reserve tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 when compared with the amount of fluid displaced in lower working chamber 46. This difference in the amount of fluid displaced is the rod volume and it flows through base valve assembly 38.

Reserve tube 36 surrounds pressure tube 30 to define a reserve chamber 54 located between the tubes. The bottom end of reserve tube 36 is closed by an end cap 56 which is adapted to be connected to the unsprung portion of vehicle 10. The upper end of reserve tube 36 is attached to rod guide 50 by mechanically deforming the open end of reserve tube 36 to form a retaining flange 58. Base valve assembly 38 is disposed between lower working chamber 46 and reserve chamber 54 to control the flow of fluid, the rod volume of fluid, between the two chambers. When shock absorber 20 extends in length (rebound), an additional amount of fluid is needed in lower working chamber 46. Thus, fluid will flow from reserve chamber 54 to lower working chamber 46 through base valve assembly 38. When shock absorber 20 shortens in length (compression), an excess of fluid must be removed from lower working chamber 46. Thus, fluid will flow from lower working chamber 46 to reserve chamber 54 through base valve assembly 38. The damping characteristics for shock absorber 20 during an extension stroke are controlled by the valving in piston assembly 32 and the damping characteristics for shock absorber 20 during a compression stroke are controlled by valving in base valve assembly 38.

A dynamic vibration absorber 70 is attached to piston rod 34 to suppress the vibrations of piston rod 34 at its resonant frequency. Dynamic vibration absorber 70 also functions as a dirt shield which protects and shields piston rod 34 from water and other contaminants. Dynamic vibration absorber 70 comprises a damping mass 72, a cap 74, a retainer 76 and a pair of elastomeric mounts 78.

Damping mass 72 is a cup-shaped element which forms the dirt shield for shock absorber 20. A bottom 80 of cup-shaped damping mass 72 defines a hole 82 through which piston rod 34 and cap 74 extend. An annular wall 84 of cup-shaped damping mass 72 extends axially from the bottom to cover piston rod 34 as well as reserve tube 36.

Figure 3:
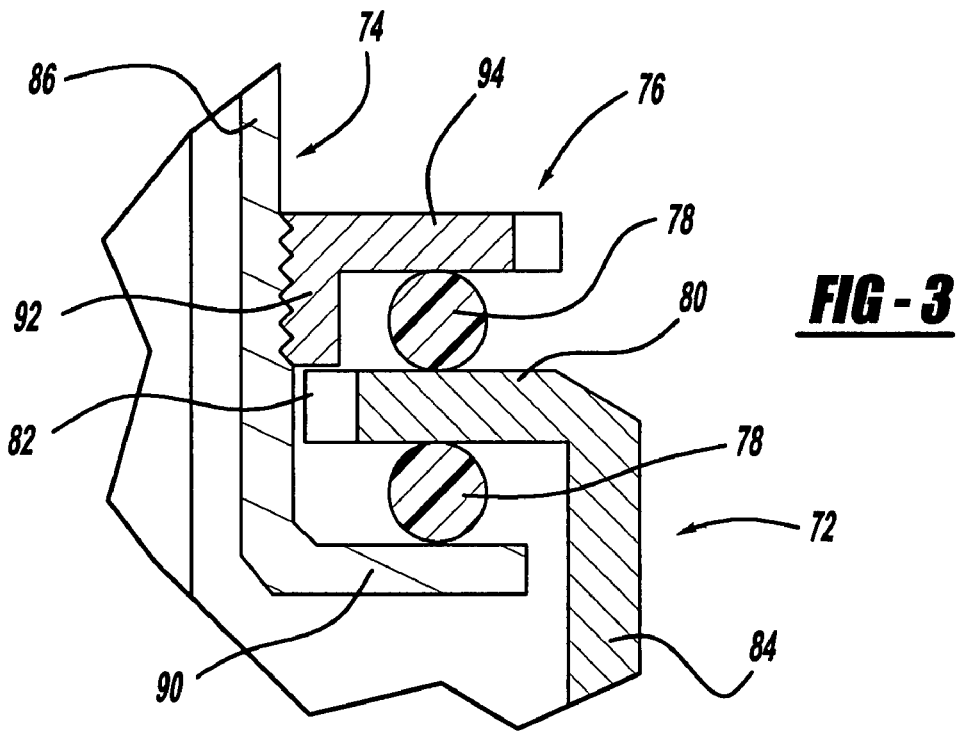
FIG. 3 is an enlarged cross-sectional view of the tuned dynamic vibration absorber illustrated in FIG. 2.

Cap 74 defines an annular body 86 which extends down the side of piston rod 34, an upper flange 88 which extends radially inward from annular body 86 to engage a shoulder on piston rod 34 and a lower flange 90 which extends radially outward from annular body to a position within cup-shaped damping mass 72 which is below bottom 80 as illustrated in FIGS. 2 and 3. When assembled into a vehicle, an upper shock absorber mount will engage upper flange 88 to secure dynamic vibration absorber 70 to piston rod 34.

Retainer 76 defines an annular wall 92 having a female thread and a flange 94 extending radially outward from annular wall 92. The female thread on annular wall 92 threadingly engages a male thread on annular body 86 of cap 74. While retainer 76 is disclosed as threadingly engaging cap 74, retainer 76 can be attached to cap 74 by any other means known in the art. Cap 74 and retainer 76 define a retention mechanism for securing damping mass 72 to piston rod 34.

One elastomeric mount 78 is disposed between flange 94 of retainer 76 and bottom 80 of damping mass 72. The other elastomeric mount 78 is disposed between bottom 80 of damping mass 72 and lower flange 90 of cap 74. While elastomeric mounts 78 are illustrated as O-rings, it is within the scope of the present invention to utilize any shape for either one or both of elastomeric mounts 78 which meet a specific performance requirement.

Dynamic vibration absorber 70 provides the added mass to suppress the vibrations of piston rod 34. Damping mass 72 is separated from cap 74 using the pair of elastomeric mounts 78. The compression ratio of elastomeric mounts 78 will determine the preload and thus the stiffness of dynamic vibration absorber 70. Thus, the tuning for dynamic vibration absorber can be accomplished by changing the preload on elastomeric mounts 78 changing the design of elastomeric mounts 78 and/or changing the material for elastomeric mounts 78. Elastomeric mounts 78 will also provide additional damping to the system which is an additional feature which operates to suppress the introduced resonances.

Figure 4:
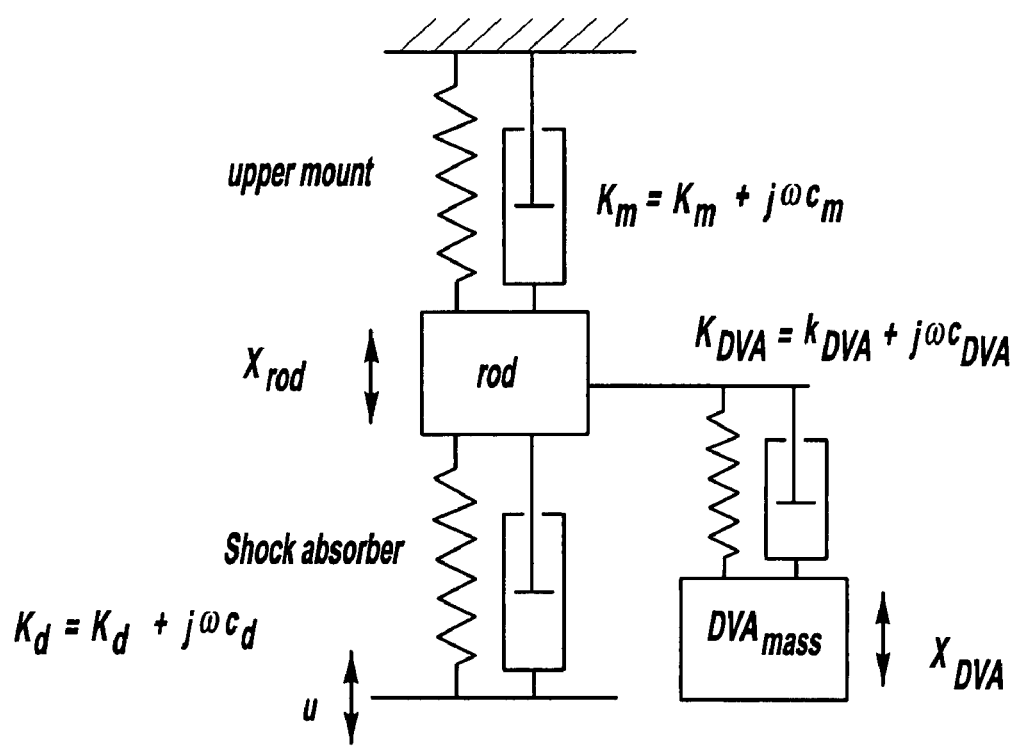
FIG. 4 is the equivalent mechanical system of the shock absorber and the dynamic vibration absorber.
Figure 6:
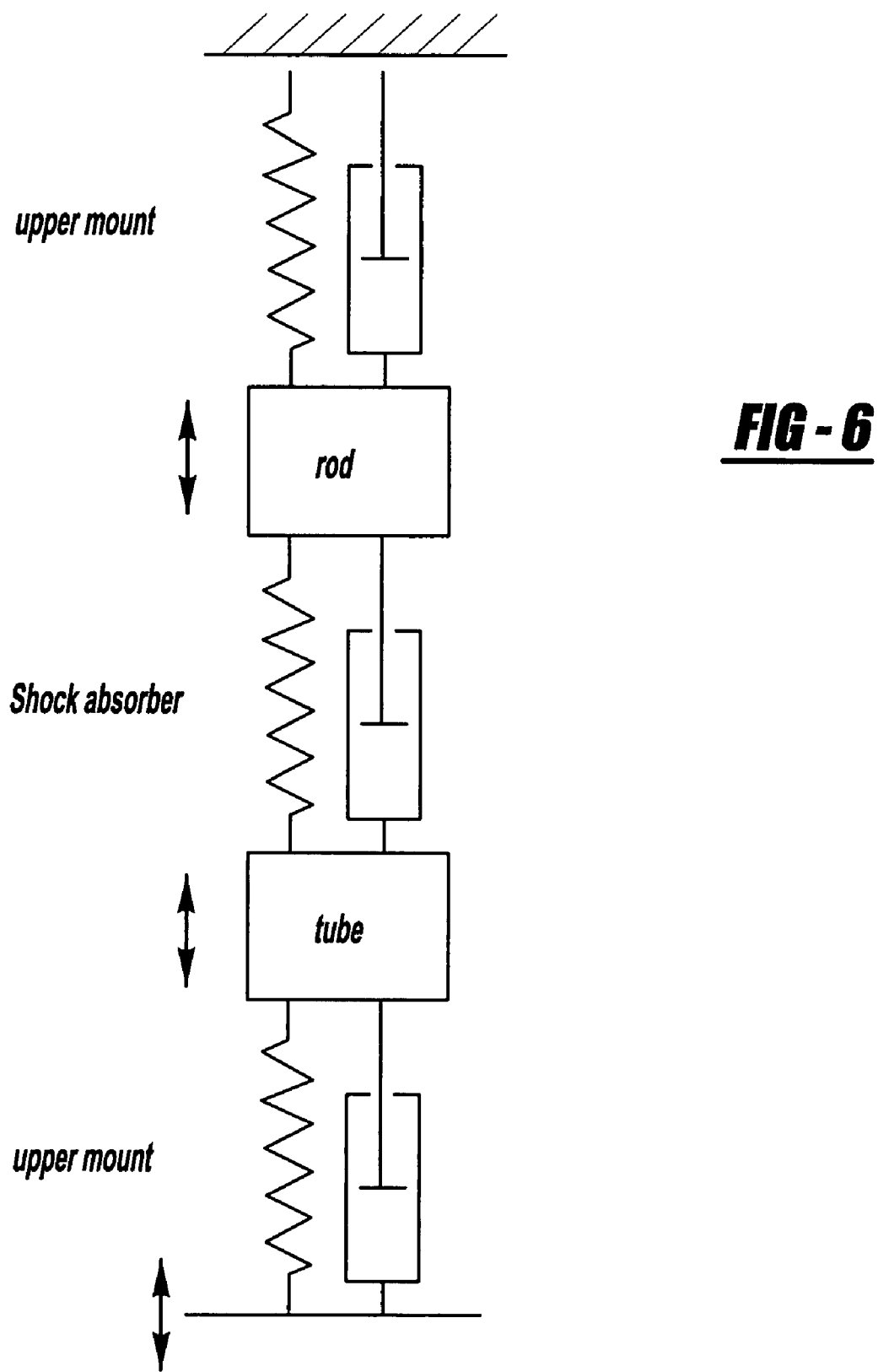
FIG. 6 is the equivalent mechanical system of a shock absorber without a dynamic vibration absorber.

Dynamic vibration absorber 70 is an effective and easy way to suppress vibrations at a specific resonance frequency. Dynamic vibration absorber 70 is tuned to suppress the resonance of a first order system by adding a simple spring/mass system. The spring rate and mass of the added system must be tuned such that the system has a resonant frequency on its own that is equal to the resonant frequency of piston rod 34. FIG. 4 shows the mechanical system of the shock absorber illustrated by FIG. 6 but with dynamic vibration absorber 70 added. In FIG. 4, the system is simplified by eliminating the lower mount bushing which is assumed to be very stiff.

The piston rod resonance can be calculated by the following set of equations $$K_m X_{rod} + M_{rod} \ddot{X}_{rod} + K_d(X_{rod} - u) + K_{DVA}(X_{rod} - X_{DVA}) = 0$$

$$M_{DVA} \ddot{X}_{DVA} + K_{DVA}(X_{DVA} - X_{rod}) = 0$$

$K_m$, $K_d$ and $K_{DVA}$ are complex dynamic stiffness of respectively the upper mount, shock absorber 20 and dynamic vibration absorber 70. $M_{rod}$ and $M_{DVA}$ are the modal masses of piston rod 34 and dynamic vibration absorber 70.

Dynamic vibration absorber 70 is designed such that its resonant frequency is equal to the frequency of piston rod 34. Thus $$f_{rod} = \frac{1}{2\pi}\sqrt{\frac{k_d + k_m}{m_{rod}}} = \frac{1}{2\pi}\sqrt{\frac{k_{DVA}}{m_{DVA}}} = f_{DVA}$$

Figure 5:
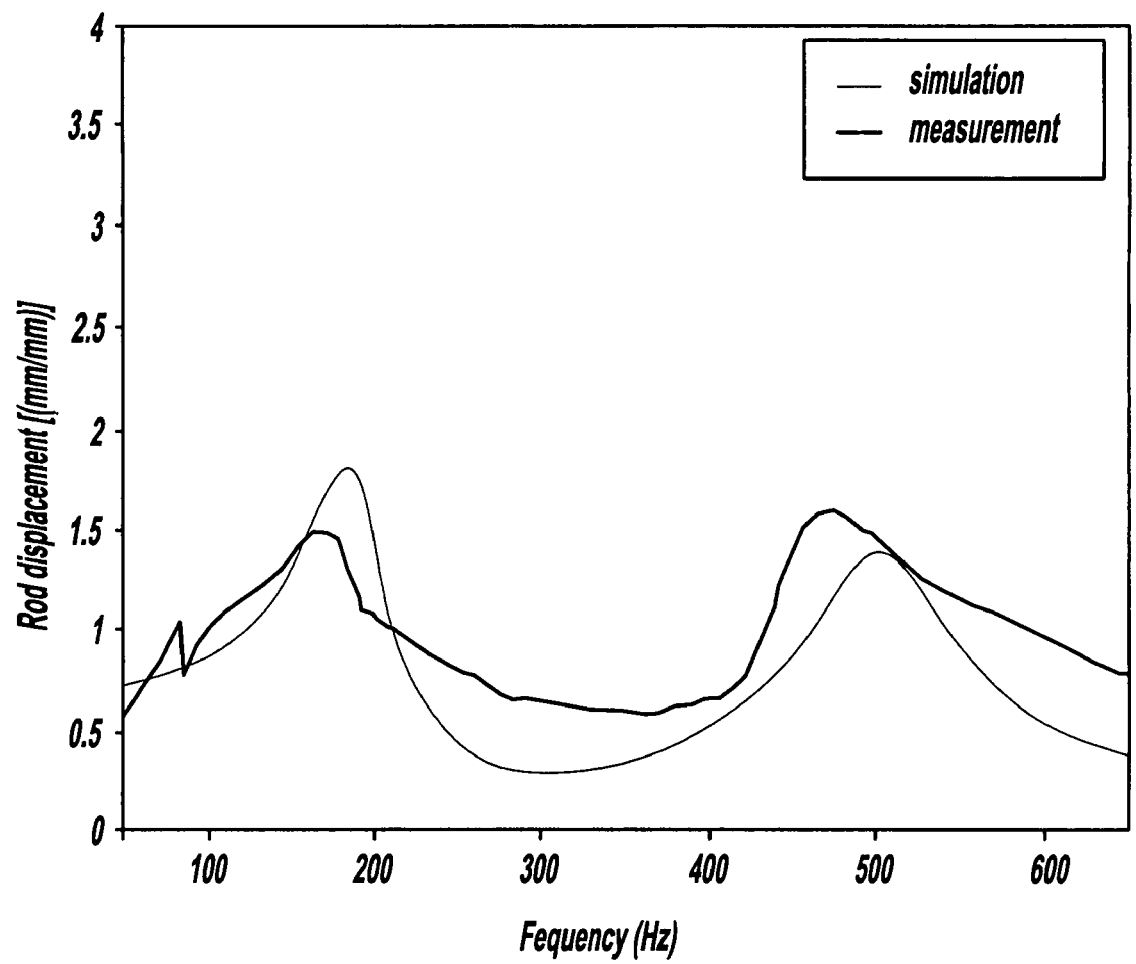
FIG. 5 is a graph illustrating the piston rod and dynamic vibration absorber's resonance.
Figure 7:
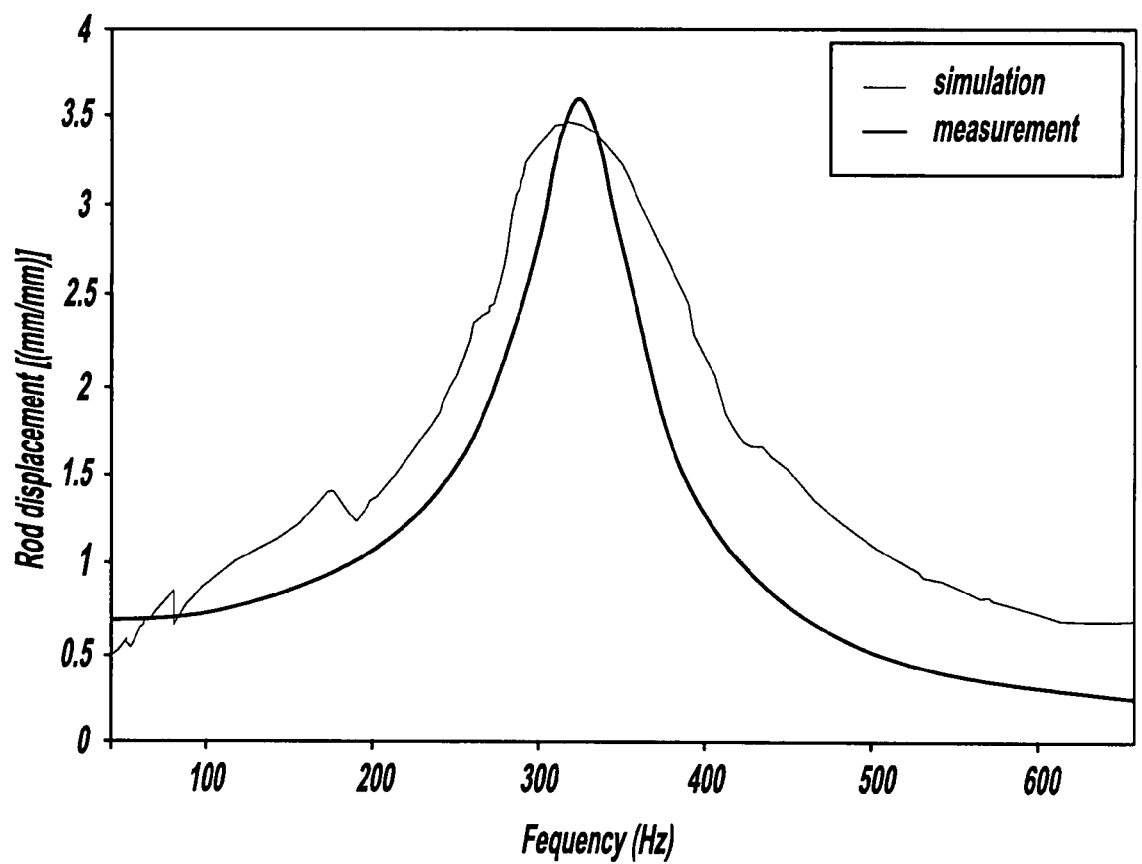
FIG. 7 is a graph illustrating the piston rod's resonance without a dynamic vibration absorber.

The result will be that the single resonance peak illustrated in FIG. 7 will be split up into two peaks. One peak will be less than the single resonance peak and the other peak will be greater than the resonance peak as illustrated in FIG. 5 which illustrates the simulated and measured resonance for a shock absorber which includes dynamic vibration absorber 70.

What is claimed is:

1. A shock absorber comprising:
a pressure tube defining a fluid chamber;
a piston assembly disposed within said fluid chamber, said piston assembly dividing said fluid chamber into an upper working chamber and a lower working chamber;
a piston rod attached to said piston assembly, said piston rod extending from said piston through one end of said pressure tube; and
a dynamic vibration absorber attached to said piston rod, said dynamic vibration absorber including a retention mechanism engaging said piston rod, a damping mass and an elastomeric member disposed directly between said damping mass and said retention mechanism, direct contact between said damping mass and said retention mechanism being prohibited by said elastomeric member, said damping mass being a cup-shaped element having a bottom engaging said elastomeric member and an annular wall attached to said bottom, said engagement between said bottom and said elastomeric member being the only attachment of said damping mass to a component of said shock absorber, wherein said retention mechanism comprises:
a cap attached to said piston rod; and
a retainer attached to said cap; wherein
said damping mass is attached to said cap; and said elastomeric member comprises:
a first elastomeric mount disposed between said retainer and said damping mass; and
a second elastomeric mount disposed between said damping mass and said cap.

2. The shock absorber according to claim 1, wherein a resonant frequency of said dynamic vibration absorber is generally equal to a resonant frequency of said piston rod.

3. The shock absorber according to claim 1, wherein said damping mass comprises a dirt shield for said shock absorber.

4. The shock absorber according to claim 1, wherein said retainer movably engages said cap, an adjustment mechanism being formed by said movable engagement between said retainer and said cap.

5. The shock absorber according to claim 4, wherein said retainer threadingly engages said cap.

6. The shock absorber according to claim 1, wherein said shock absorber further comprises:
a reserve tube disposed around said pressure tube, a reserve chamber being defined between said pressure tube and said reserve tube; and
a base valve assembly disposed between said fluid chamber and said reserve chamber.

7. The shock absorber according to claim 6, wherein a resonant frequency of said dynamic vibration absorber is generally equal to a resonant frequency of said piston rod.

8. The shock absorber according to claim 6, wherein said damping mass comprises a dirt shield for said shock absorber.

9. The shock absorber according to claim 6, wherein said retainer movably engages said cap, an adjustment mechanism being formed by said movable engagement between said retainer and said cap.

\* \* \* \* \*